United States Patent
Hand et al.

(10) Patent No.: US 8,230,414 B1
(45) Date of Patent: Jul. 24, 2012

(54) SOFTWARE DISTRIBUTION AND CACHE MANAGEMENT ACROSS CLIENT MACHINES ON A NETWORK

(75) Inventors: Steven Joseph Hand, San Jose, CA (US); Sriram Subramanian, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 1109 days.

(21) Appl. No.: 11/455,125

(22) Filed: Jun. 16, 2006

Related U.S. Application Data

(60) Provisional application No. 60/691,085, filed on Jun. 16, 2005.

(51) Int. Cl.
*G06F 9/44* (2006.01)
*G06F 9/445* (2006.01)

(52) U.S. Cl. ........ 717/168; 717/169; 717/170; 717/171; 717/172; 717/173; 717/174; 717/175; 717/176; 717/177; 717/178

(58) Field of Classification Search .................. 717/168, 717/127, 122, 102, 177, 174, 170
See application file for complete search history.

(56) References Cited

U.S. PATENT DOCUMENTS

| | | | | |
|---|---|---|---|---|
| 5,845,077 A * | 12/1998 | Fawcett | ........................ | 709/221 |
| 5,991,544 A * | 11/1999 | Godse | ........................... | 717/167 |
| 6,286,050 B1 * | 9/2001 | Pullen et al. | ................... | 709/229 |
| 6,473,756 B1 * | 10/2002 | Ballard | ................................ | 1/1 |
| 6,671,876 B1 * | 12/2003 | Podowski | ..................... | 717/130 |
| 6,751,794 B1 * | 6/2004 | McCaleb et al. | ............. | 717/168 |
| 7,062,765 B1 * | 6/2006 | Pitzel et al. | ................... | 717/177 |
| 7,080,372 B1 * | 7/2006 | Cole | .............................. | 717/173 |
| 7,127,713 B2 * | 10/2006 | Davis et al. | .................... | 717/177 |
| 7,296,084 B2 * | 11/2007 | Thayer et al. | ................. | 709/236 |
| 7,584,466 B1 * | 9/2009 | Rao | ................................. | 717/168 |
| 7,698,698 B2 * | 4/2010 | Skan | ............................. | 717/168 |
| 7,801,947 B2 * | 9/2010 | Yeh et al. | ...................... | 709/203 |
| 7,844,963 B2 * | 11/2010 | Pitzel et al. | .................... | 717/171 |
| 2002/0092010 A1 * | 7/2002 | Fiske | ............................. | 717/168 |
| 2002/0099798 A1 * | 7/2002 | Fedorovsky et al. | ......... | 709/219 |
| 2002/0112232 A1 * | 8/2002 | Ream et al. | .................... | 717/176 |
| 2002/0122070 A1 * | 9/2002 | Watanabe | ..................... | 345/810 |
| 2002/0188933 A1 * | 12/2002 | Lee et al. | ...................... | 717/168 |

(Continued)

OTHER PUBLICATIONS

Monitoring System and Network Metrics, SunwWorld, Oct. 1997 by Henderson et al.*

(Continued)

*Primary Examiner* — Emerson Puente
*Assistant Examiner* — Charles Swift
(74) *Attorney, Agent, or Firm* — North Weber & Baugh LLP; Bradford Goodson; David L. Soltz

(57) ABSTRACT

A system, apparatus and a method are described for providing efficient software distribution and cache management on a plurality of client machines in a network. In one embodiment of the invention, a cache management software agent is installed on one or more client machines to monitor a status of software versions stored locally on the machines. The cache management software agent performs a check before uploading a matching version of a large software application from a network element in order to determine whether the upload is appropriate. In particular, the agent identifies whether a matching version of the application is already present on the client machine to see if the upload is necessary. If a matching version of the application is not resident on the machine, then the latest version of the large software application is uploaded to the client machine from the network element.

2 Claims, 4 Drawing Sheets

U.S. PATENT DOCUMENTS

| | | | |
|---|---|---|---|
| 2003/0121003 A1* | 6/2003 | Soshalsky et al. | 715/513 |
| 2003/0158831 A1* | 8/2003 | Zaremba | 707/1 |
| 2004/0015940 A1* | 1/2004 | Heisey et al. | 717/168 |
| 2004/0044997 A1* | 3/2004 | Talati et al. | 717/170 |
| 2004/0083472 A1* | 4/2004 | Rao et al. | 717/171 |
| 2004/0123283 A1* | 6/2004 | Brown et al. | 717/171 |
| 2004/0128198 A1* | 7/2004 | Register et al. | 705/14 |
| 2004/0133444 A1* | 7/2004 | Defaix et al. | 705/1 |
| 2004/0181790 A1* | 9/2004 | Herrick | 717/168 |
| 2004/0215755 A1* | 10/2004 | O'Neill | 709/223 |
| 2005/0108288 A1* | 5/2005 | Hartshorne et al. | 707/200 |
| 2005/0125528 A1* | 6/2005 | Burke et al. | 709/223 |
| 2005/0160395 A1* | 7/2005 | Hughes | 717/102 |
| 2005/0268296 A1* | 12/2005 | Marolia et al. | 717/168 |
| 2006/0265425 A1* | 11/2006 | Raff et al. | 707/200 |
| 2007/0073846 A1* | 3/2007 | Reisman | 709/219 |
| 2008/0168153 A1* | 7/2008 | Boesch | 709/217 |

OTHER PUBLICATIONS

HP Company, "Event Log Messages", 2000, http://www.hp.com/rnd/pdfs/event_log_messages.pdf, pp. 1-27.*
Java Web Start Overview, May 2005, 14 pages, U.S.
Java(TM) Network Launching Protocol & API Specification (JSR-56), May 21, 2005, 85 pages, Version 1.5, Sun Microsystems, Inc., Palo Alto, CA.

* cited by examiner

SOFTWARE DISTRIBUTION AND CACHE MANAGEMENT ACROSS CLIENT MACHINES ON A NETWORK

CROSS REFERENCE TO RELATED PATENT APPLICATIONS

This application claims priority to U.S. Provisional Application Ser. No. 60/691,085, entitled "Software Distribution and Cache Management Across Gateway Network Elements (GNEs)," filed Jun. 16, 2005, which application is incorporated herein by reference in its entirety.

BACKGROUND

A. Technical Field

The present invention relates generally to cache management on a web server client machine, and more particularly, to a cache management system that employs software build numbers and efficiently distributes software across various client machines on a network.

B. Background of the Invention

The importance of networking technology in today's society is well understood. Current networks allow large amounts of information to be transmitted at high data rates across very long distances. The reliance on these networks by individuals and companies requires that the networks operate with minimal failures.

The network elements typically have software applications that perform various functions on the elements. Certain software applications may be updated overtime resulting in multiple versions of the application residing on a client machine that is used to manage one or more network elements.

Web-based management software, such as a Graphical Node Manager ("GNM"), is available to manage network elements within a transmission network. This management software is web-based so it can be uploaded from a remote source and operate on a typical client machine. To enable uploading such software, Sun Microsystems provides a "Java Web Start" application as a mechanism to upload and execute applications over the network using a Java Networking Launching Protocol ("JNLP") standard.

An exemplary illustration of a JNLP application is illustrated in FIG. 1A. JNLP allows a software application to be upgraded on a Web Start server 100 on the network. The upgraded version 101 of the application is then uploadable to any of the Web Start client machines 102-104 via network connections. The Java Web Start application performs caching and uploading of the application based on the universal resource locator ("URL") including the IP address of the server and can upload the software application 101 to any client machine 102-104.

Each time a new version of the software application is added or user accesses a new network element, the JNLP will cause the upload of the matching software application version from each of the network elements in the network to one or more client machines. This distribution and storage of software may place a significant load on a network and cause inefficient use of storage on the client machines.

By way of example, assume that a large software application version of 7 MB is residing on the web server of a network element. If there are 100 network elements and each network element having a different URL due to differing IP addresses, then a software application version of about 7 MB in size will be uploaded 100 times to the client machine even if some of the client machines currently have the matching version of the software application. Additionally, each version may reside on the client machine for an extended period of time resulting in older versions being stored and a poor use of memory on the client machine.

This process is further complicated if the software application is residing on a sub-tending network element. Referring to FIG. 1B, the client machines 102-104 are to receive the software application from a sub-tending network element 150 through a gateway network element or elements 130, 135. These gateway network elements 130, 135 serve as proxies and effectively forward network traffic, including the software upload, from the sub-tending network element 150 to the client machines 102-104. Because the URLs of the sub-tending network elements 150 vary depending on which gateway network element is acting as the proxy, further duplicative uploads of the software application may be performed on the client machines 102-104.

SUMMARY OF THE INVENTION

The present invention provides a system, apparatus and method for efficiently distributing software application versions and the storage management of these versions across a plurality of client machines on a network.

In one embodiment of the invention, a small software agent, termed a "cache manager," is installed on one or more client machines. The cache manager may be uploaded from a network element using Java Web Start or other technology in order to operate on the client machine(s). A network element contains an updated version of a large software application and communicates this version by providing a build number identifier to a client machine through a web server residing on the network element.

This identifier may be within an XML file or other data file that is transmitted from the network element to the client machine. In various embodiment of the invention, the cache manager extracts the build number identifier of the large software application and compares it to corresponding build numbers of the software applications located on the client machine. An upload of a version of the large software application is allowed on the client machine only if that client machine does not already contain the corresponding version of the large software application.

In various embodiments of the invention, the cache manager is provided with a simultaneous download detection module that prevents concurrent uploads of the same version of the software application if a previously requested upload of the same build number is in progress. The cache manager may also contain an auto clean-up module for deleting old versions of the software application that have been unused on the client machine(s) for more than a predetermined period.

In various embodiments of the present invention, a network system provides software distribution and cache management across a plurality of network elements. The network system comprises a web server containing a downloadable large-sized software program and a cache manager that identifies versions of the large-sized software program that are stored on the client machine and on the network element. Each client machine is coupled as remote web clients to the web server.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1A:
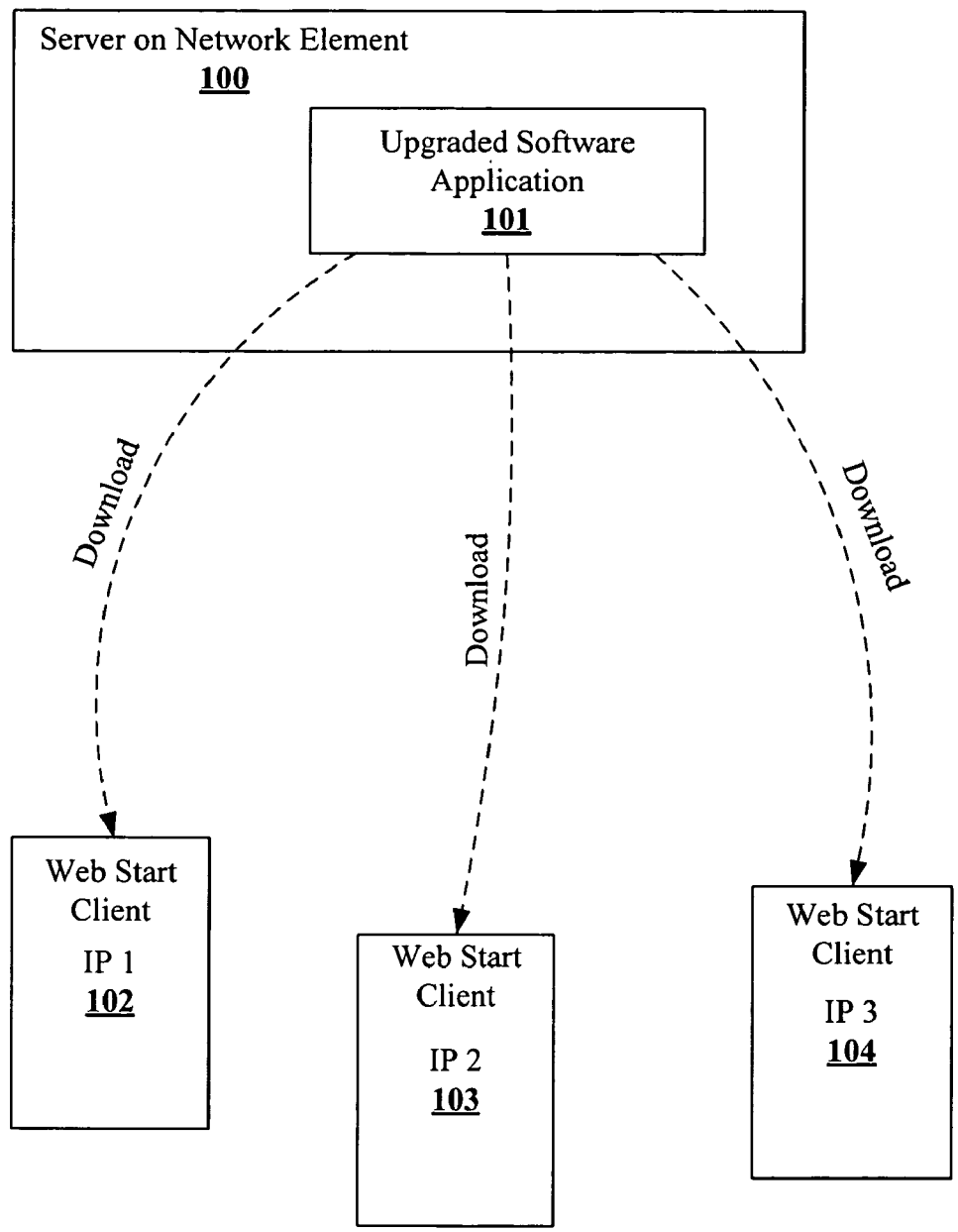
FIG. 1A illustrates a prior art approach for uploading a graphical node manager application on client machines within a network.
Figure 1B:
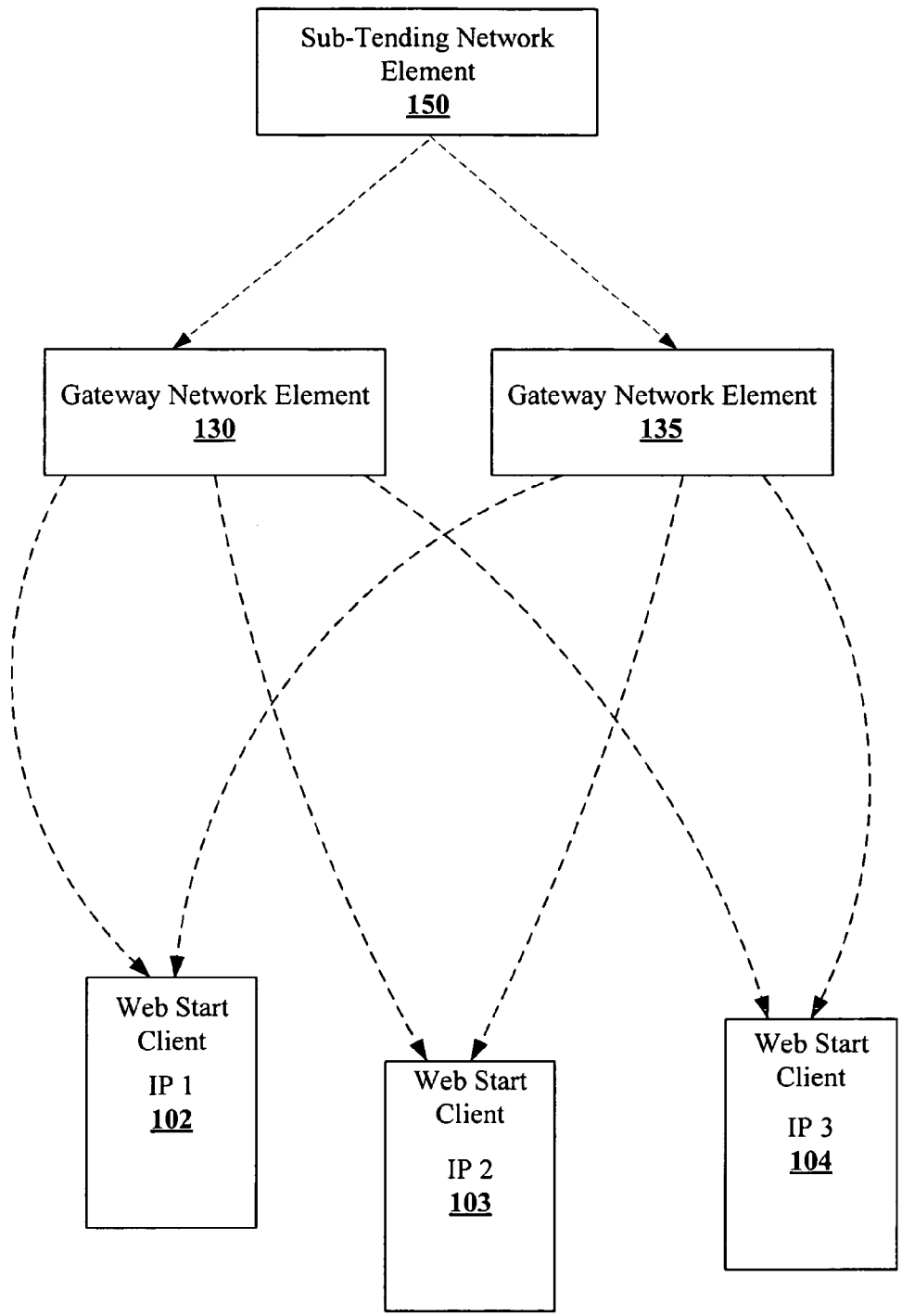
FIG. 1B illustrates an approach for uploading a graphical node manager application on client machines located on a sub-tending network.

A system, apparatus and a method are described for providing efficient software distribution and cache management on a plurality of client machines in a network. In one embodiment of the invention, a cache management software agent is installed on one or more client machines to monitor a status of software versions stored locally on the machines. The cache management software agent performs a check before uploading a matching version of a large software application from a network element in order to determine whether the upload is appropriate. In particular, the agent identifies whether a matching version of the application is already present on the client machine to see if the upload is necessary. If the matching version of the application is not resident on the machine, then the matching version of the large software application is uploaded to the client machine from the network element.

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

The present invention enables a network element to upload a web-based software management agent or module, called a "cache manager," to one or more client machines. The agent facilitates an efficient uploading process of software applications across the client machines on the network. The cache manager also manages the storage of multiple versions of the software application residing on the client machines.

In one embodiment of the invention, the cache manager is uploaded from each URL including the remote IP address on the network to the client machine. Once installed on the client machine, the cache manager prevents unnecessary uploads of software application versions to the client machine by identifying if a matching version is already resident on the machine prior to uploading. For example, the cache manager may identify or track build version(s) of a particular software application on the client machine and compare those version(s) to an available latest version located on a web server. If a matching version is already present on the client machine, then an upload of the software application version from the web server is unnecessary and would be blocked by the cache manager.

Figure 2:
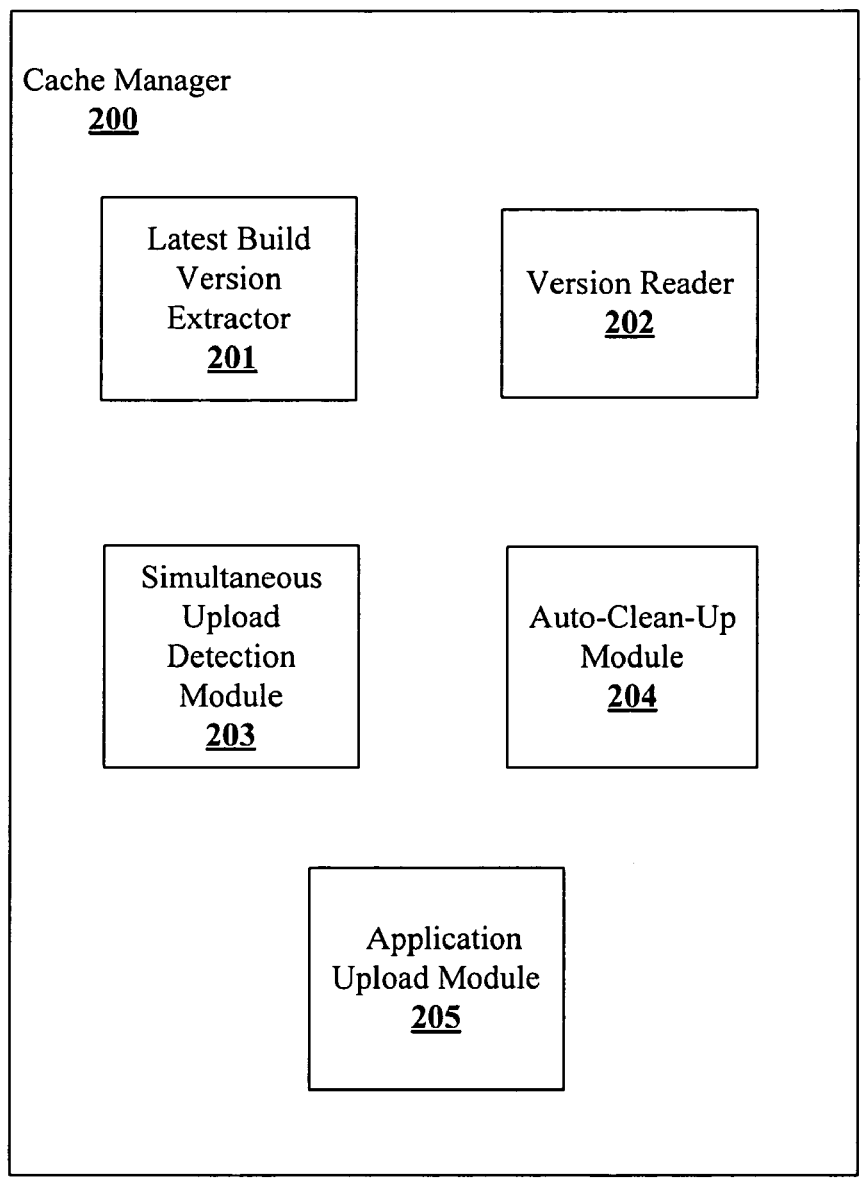
FIG. 2 is a block diagram illustrating a cache manager according to one embodiment of the invention.

FIG. 2 shows an exemplary layout of a cache manager 200 according to one embodiment of the invention. The cache manager 200 comprises multiple modules including a latest build version extractor module 201, a version reader 202, a simultaneous upload detection module 203, an auto clean-up module 204, and an application upload module 205. In one embodiment of the invention, the cache manager 200 is approximately 150 KB in size.

The latest build version extraction module 201 extracts a latest build number of a large software application that is stored on a network element and available for upload on the client machine. In one embodiment, the network element (e.g., web server) passes information about the software application version to a client machine. For example, a build number identifier associated with the software application version may be communicated as part of an XML file of Java JNLP protocol data to the client machine. The latest build version extraction module 201 extracts a build number identifier from this information that was transmitted by the network element. Using this identifier, the cache manager 200 determines whether an upload of the particular version of the software application from the network element is appropriate.

The version reader module 202 is provided in the cache manger 200 in order to identify the version(s) of the software application that are resident on the client machine. One skilled in the art will recognize that these application versions may be identified on a client machine using various techniques such as accessing a version table or having the version reader module 202 access each software application version and extract corresponding build numbers therefrom.

The application upload module 205 compares the extracted latest build number provided by the network element to the build numbers stored on the client machine. If the extracted latest build number is present on the client machine, then an upload is not necessary and is blocked. However, if the extracted latest build number is not present on the client machine, then an upload is performed to update the software application on the client machine. This process prevents unnecessary uploads of previously installed software application versions on a client machine.

The simultaneous download detection module 203 prevents concurrent uploads of the same application version from the network element to the client machine. For example, the module 203 may identify and analyze active uploads to the client machine in order to identify if initiating another upload would be duplicative.

The cache manager 200 may also contain an auto clean-up module 204 that removes older versions of a software application when appropriate. In one embodiment of the invention, the auto clean-up module 204 analyzes each version of a software application to determine when the version was last used. If an application version has not been used for a particular period of time, it is deleted. Accordingly, when a network element is accessed, the software application is used prior to any clean-up processes to ensure that a latest version is not inappropriately deleted.

B. Method of Downloading Large Software Applications in a Network

Figure 3:
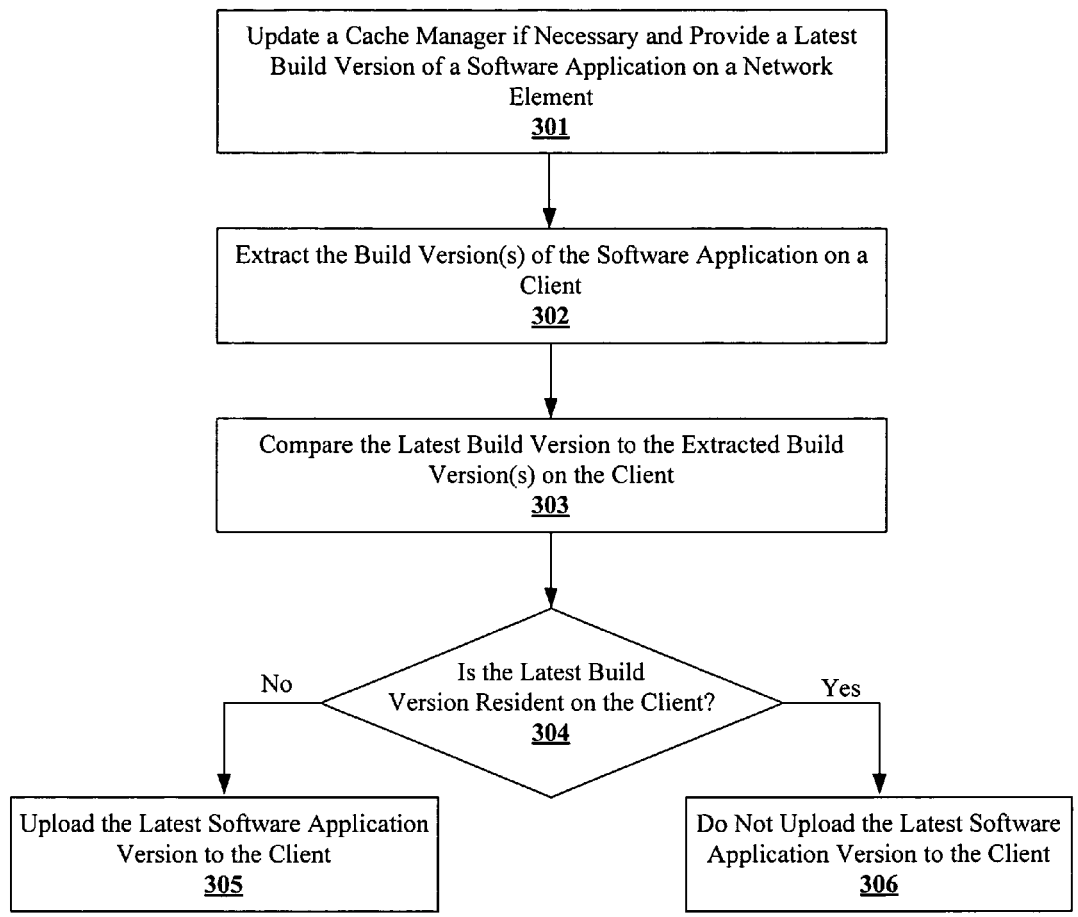
FIG. 3 is a flowchart illustrating a general method of efficiently uploading a management software program version across client machines on a network according to one embodiment of the invention.

FIG. 3 shows a flowchart illustrating a general method, independent of structure, for efficiently managing and updating large software applications that are stored and updated across client machines according to one embodiment of the invention. The method may be initiated by installing, updating or configuring a small software agent, such as the "cache manager," on one or more client machines. A web server stores a most current or latest version of the large software application and provides 301 a latest version identifier or build number identifier to the client machines. As previously described, this identifier may be provided in an XML file or other data file.

The cache manager extracts or otherwise identifies 302 the build numbers that are resident on the client machine. This identification may be done by accessing a build version table or directly accessing the software application versions stored on the client machine. The cache manager compares 303 the latest build number received from the network element to the identified build versions stored on the cache manager.

This comparison identifies whether a matching version of the software application stored on the network element has already been stored on the client machine 304. If a matching version of the software application is not resident on the client machine, then the latest software application is uploaded 305 from the network element to the client machine. If a matching version of the software application is resident on the client machine, then the upload is blocked 306.

Thus the present invention provides a mechanism and a cache management system that efficiently maintains and caches the large application, such as graphical node manager, based upon software build numbers instead of IP address.

The foregoing description of the invention has been described for purposes of clarity and understanding. It is not intended to limit the invention to the precise form disclosed. Various modifications may be possible within the scope and equivalence of the appended claims.

We claim:

1. A method comprising:

uploading a cache manager to a client machine, wherein the cache manager is stored at a network element, the cache manager:

receiving, at the client machine, a software application version identifier, associated with a first version of a software application stored at the network element;

identifying a version number associated with a second version of the software application stored on the client machine;

comparing the software application identifier to the version number to determine whether the first version of the software application on the network element is the same as the second version of the software application stored on the client machine;

uploading the first version of the software application from the network element to the client machine if the software application version identifier does not match the version number and a prior upload of the first version of the software has not begun;

deleting the second version of the software application stored on the client machine if the second version of the software has not been used within a predetermined period of time; and running the uploaded first version of the software application on the client machine prior to said deleting the second version of the software application stored on the client machine.

2. A computer program product embodied on a computer readable medium, the computer program product comprising computer instructions for:

uploading a cache manager to a client machine, wherein the cache manager is stored at a network element, the cache manager:

receiving, at the client machine, a software application version identifier, associated with a first version of a software application, stored at the network element;

identifying a version number associated with a second version of the software application stored on the client machine;

comparing the software application identifier to the version number to determine whether the first version of the software application on the network element is the same as the second version of the software application stored on the client machine;

uploading the first version of the software application from the network element to the client machine if the software application version identifier does not match the version number and a prior upload of the first version of the software has not begun;

deleting the second version of the software application stored on the client machine if the second version of the software has not been used within a predetermined period of time; and running the uploaded first version of the software application on the client machine prior to said deleting the second version of the software application stored on the client machine.

* * * * *